(12) United States Patent
Zufall

(10) Patent No.: US 12,375,899 B2
(45) Date of Patent: Jul. 29, 2025

(54) BLOCKCHAIN-BASED SYSTEM FOR REESTABLISHING SEQUENCING AFTER CONNECTION LOSS BETWEEN DISTRIBUTED SUBSCRIBER DATABASE AND A 5G CORE

(71) Applicant: DISH Wireless L.L.C., Englewood, CO (US)

(72) Inventor: David Zufall, Englewood, CO (US)

(73) Assignee: DISH Wireless L.L.C., Englewood, CO (US)

( * ) Notice: Subject to any disclaimer, the term of this patent is extended or adjusted under 35 U.S.C. 154(b) by 476 days.

(21) Appl. No.: 18/060,488

(22) Filed: Nov. 30, 2022

(65) Prior Publication Data

US 2024/0048961 A1    Feb. 8, 2024

Related U.S. Application Data

(60) Provisional application No. 63/396,151, filed on Aug. 8, 2022.

(51) Int. Cl.
*H04W 8/20* (2009.01)
*H04W 8/26* (2009.01)

(52) U.S. Cl.
CPC .............. *H04W 8/20* (2013.01); *H04W 8/26* (2013.01)

(58) Field of Classification Search
CPC .................................. H04W 8/20; H04W 8/26
USPC ................... 455/414.1, 410, 422.1, 418, 423
See application file for complete search history.

(56) References Cited

U.S. PATENT DOCUMENTS

| 2020/0195495 | A1* | 6/2020 | Parker | H04L 41/40 |
| 2023/0388871 | A1* | 11/2023 | Guo | H04W 36/0069 |
| 2024/0048963 | A1* | 2/2024 | Zufall | H04W 8/22 |
| 2024/0430092 | A1* | 12/2024 | Shrivastava | H04L 9/3213 |

OTHER PUBLICATIONS

"3rd Generation Partnership Project; Technical Specification Group Radio Access Network; NG-RAN; Architecture description (Release 16)," Technical Specification, 3GPP TS 38.401 V16.8.0, Dec. 2021, 79 pages.

* cited by examiner

*Primary Examiner* — Nghi H Ly
(74) *Attorney, Agent, or Firm* — Seed IP Law Group LLP

(57) ABSTRACT

Embodiments are directed towards systems and methods for reestablishing sequencing after connection loss between a Distributed Subscriber Database and a 5G Core. One such method including: recording authentication sequence numbers from the Distributed Subscriber Database to the distributed 5G Cores using a distributed ledger of a blockchain; in response to a lost connection between a 5G Core of the plurality of 5G Cores and the Distributed Subscriber Database, enabling the 5G Core to operate from a local copy of the Distributed Subscriber Database; reconnecting the lost connection between the 5G Core of the plurality of 5G Cores and the Distributed Subscriber Database; accessing the recorded sequence numbers from the Distributed Subscriber Database using the distributed ledger of the blockchain; and obviating the number sequencing issue between the Distributed Subscriber Database and the reconnected 5G Core of the plurality of 5G Cores using the recorded authentication sequence numbers in the distributed ledger of the blockchain.

20 Claims, 9 Drawing Sheets

BLOCKCHAIN-BASED SYSTEM FOR REESTABLISHING SEQUENCING AFTER CONNECTION LOSS BETWEEN DISTRIBUTED SUBSCRIBER DATABASE AND A 5G CORE

BACKGROUND

As the use of smart phones and Internet of Things (IoT) devices has increased, so too has the desire for more reliable, fast, and continuous transmission of content. In an effort to improve the content transmission, networks continue to improve with faster speeds and increased bandwidth. The advent and implementation of Fifth Generation (5G) wireless technology has resulted in faster speeds and increased bandwidth. Thus, minimizing interruptions in the supporting networking infrastructure is important to providing a resilient and stable network with the desired end-to-end performance. It is with respect to these and other considerations that the embodiments described herein have been made.

In some types of 5G network architecture, multiple 5G Cores are connected to a central database that manages subscriber information. During operation of the 5G network, there may be occasions when connections between one or more of the 5G Cores and the central database are disrupted or otherwise lost, due to power outages or other reasons. When these connections between one or more of the 5G Cores and the central database are reestablished, there is often an authentication sequencing issue (i.e., device authentication attempts appear out of sequence which can indicate an intrusion attempt) due to the connection loss. To date, many companies had employed undesirable work-around techniques to address this issue, such as proceeding with unsynchronized authentications or re-setting counters. However, an actual solution to this problem that is robust and scalable has yet to be produced. The present disclosure addresses this and other issues.

BRIEF SUMMARY

The present disclosure relates generally to telecommunication networks, more particularly, to managing 5G telecommunication networks and reestablishing sequencing after connection loss.

5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible, and virtual RAN with interfaces creating additional data access points.

5G network functions may be completely software-based and designed as cloud-native, meaning that they're agnostic to the underlying cloud infrastructure, allowing higher deployment agility and flexibility.

With the advent of 5G, industry experts defined how the 5G Core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in Telecommunications that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power better enables the high volume of connected devices inherent to 5G deployment and the rise of IoT.

The 3rd Generation Partnership Project (3GPP) develops protocols for mobile telecommunications and has developed a standard for 5G. The 5G architecture is based on what is called a Service-Based Architecture (SBA), which leverages IT development principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open-source development, ultimately to ease the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises a set of radio base stations (each known as Next Generation Node B (gNB)) connected to the 5G Core (5GC) and to each other. The gNB incorporates three main functional modules: the Centralized Unit (CU), the distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021-12). Each network function (NF) is formed by a combination of small pieces of software code called microservices.

Briefly stated, one or more methods for reestablishing sequencing after connection loss between distributed subscriber database and a 5G Core are disclosed. Some such methods include: providing a Unified Data Management system that includes a Distributed Subscriber Database and connects to a plurality of 5G Cores, wherein each 5G Core in turn connects to individual 5G end user mobile devices; recording authentication sequence numbers from the Distributed Subscriber Database to the distributed 5G Cores using a distributed ledger of a blockchain; in response to a lost connection between a 5G Core of the plurality of 5G Cores and the Distributed Subscriber Database, enabling the 5G Core to operate from a local copy of the Distributed Subscriber Database; reconnecting the lost connection between the 5G Core of the plurality of 5G Cores and the Distributed Subscriber Database; identifying a sequencing issue between the Distributed Subscriber Database and the reconnected 5G Core of the plurality of 5G Cores; accessing the recorded authentication sequence numbers from the Distributed Subscriber Database using the distributed ledger of the blockchain; and obviating the sequencing issue between the Distributed Subscriber Database and the reconnected 5G Core of the plurality of 5G Cores using the recorded authentication sequence numbers in the distributed ledger of the blockchain.

In some embodiments of the method for reestablishing sequencing after connection loss between distributed subscriber database and a 5G Core, the method further includes connecting each individual 5G end user mobile device to an associated 5G Core using an IMSI (International Mobile Subscriber Identifier) number. In another aspect of some embodiments, the method further includes identifying a mobile subscriber of each individual 5G end user mobile device by its SIM (Subscriber Identity Module) or U ICC (Universal Integrated Circuit Card) card. In still another aspect of some embodiments, the obviating a sequencing issue between the Distributed Subscriber Database and the disconnected 5G Core of the plurality of 5G Cores further includes employing a secure replication and redistribution technique. In yet another aspect of some embodiments, fraudulent individual 5G end user mobile devices are identified by sequencing anomalies from checking against the recorded sequences in the distributed ledger of the blockchain. In an additional aspect of some embodiments, distributed key authentication is used to authenticate the 5G Cores. Also, in one or more aspects of some embodiments, distributed keys are placed in the blockchain with the sequences from the Distributed Subscriber Database, instead of the 5G Cores.

In other embodiments, one or more systems for reestablishing sequencing after connection loss between distributed subscriber database and a 5G Core are disclosed. The system includes: a memory that stores computer executable instructions; and a processor that executes the computer executable instructions to cause operations to be performed, the operations including: provide a Unified Data Management system that connects to a plurality of 5G Cores, wherein each 5G Core in turn connects to individual 5G end user mobile devices; record authentication sequence numbers from the Distributed Subscriber Database to the distributed 5G Cores using a distributed ledger of a blockchain; in response to a lost connection between a 5G Core of the plurality of 5G Cores and the Distributed Subscriber Database, enable the 5G Core to operate from a local copy of the Distributed Subscriber Database; reconnect the lost connection between the 5G Core of the plurality of 5G Cores and the Distributed Subscriber Database; identify a number sequencing issue between the Distributed Subscriber Database and the reconnected 5G Core of the plurality of 5G Cores; access the recorded authentication sequence numbers from the Distributed Subscriber Database using the distributed ledger of the blockchain; and obviate the number sequencing issue between the Distributed Subscriber Database and the reconnected 5G Core of the plurality of 5G Cores using the recorded authentication sequence numbers in the distributed ledger of the blockchain.

In some embodiments of the systems for reestablishing sequencing after connection loss between distributed subscriber database and a 5G Core, the system further includes connecting each individual 5G end user mobile device to an associated 5G Core using an IMSI (International Mobile Subscriber Identifier) number. In another aspect of some embodiments, the system further includes identifying a mobile subscriber of each individual 5G end user mobile device by its SIM (Subscriber Identity Module) or U ICC (Universal Integrated Circuit Card) card. In still another aspect of some embodiments, the obviating an authentication number sequencing issue between the Distributed Subscriber Database and the disconnected 5G Core of the plurality of 5G Cores further includes employing a secure replication and redistribute technique. In yet another aspect of some embodiments, fraudulent individual 5G end user mobile devices are identified by number sequencing anomalies from checking against the recorded authentication sequence numbers in the distributed ledger of the blockchain. In an additional aspect of some embodiments, distributed key authentication is used to authenticate the 5G Cores. Also, in one or more aspects of some embodiments, distributed keys are placed in the blockchain with the authentication sequence numbers from the Distributed Subscriber Database, instead of the 5G Cores.

Additionally, in other embodiments, one or more non-transitory computer-readable storage mediums are disclosed. The one or more non-transitory computer-readable storage mediums have computer-executable instructions stored thereon that, when executed by a processor, cause the processor to: provide, by a mobile network operator, a Unified Data Management system that connects to a plurality of 5G Cores, wherein each 5G Core in turn connects to individual 5G end user mobile devices; record authentication sequence numbers from the system to the distributed 5G Cores using a distributed ledger of a blockchain; in response to a lost connection between a 5G Core of the plurality of 5G Cores and the Distributed Subscriber Database, enable the 5G Core to operate from a local copy of the Distributed Subscriber Database; reconnect the lost connection between the 5G Core of the plurality of 5G Cores and the Distributed Subscriber Database; identify a number sequencing issue between the Distributed Subscriber Database and the reconnected 5G Core of the plurality of 5G Cores; access the recorded authentication sequence numbers from the Distributed Subscriber Database using the distributed ledger of the blockchain; and obviate the number sequencing issue between the Distributed Subscriber Database and the reconnected 5G Core of the plurality of 5G Cores using the recorded authentication sequence numbers in the distributed ledger of the blockchain.

In some embodiments of the non-transitory computer-readable storage mediums for reestablishing sequencing after connection loss between distributed subscriber database and a 5G Core, the non-transitory computer-readable storage medium further includes connecting each individual 5G end user mobile device to an associated 5G Core using an IMSI (International Mobile Subscriber Identifier) or SUPI (Subscription Permanent Identifier) number. In another aspect of some embodiments, the non-transitory computer-readable storage medium further includes identifying a mobile subscriber of each individual 5G end user mobile device by its SIM (Subscriber Identity Module) card. In still another aspect of some embodiments, the obviating a number sequencing issue between the Distributed Subscriber Database and the disconnected 5G Core of the plurality of 5G Cores further includes employing a secure replication and redistribute technique. In yet another aspect of some embodiments, fraudulent individual 5G end user mobile devices are identified by number sequencing anomalies from checking against the recorded authentication sequence numbers in the distributed ledger of the blockchain. In an additional aspect of some embodiments, distributed key authentication is used to authenticate the 5G Cores. Also, in one or more aspects of some embodiments, distributed keys are placed in the blockchain with the authentication sequence numbers from the Distributed Subscriber Database, instead of the 5G Cores.

Furthermore, one or more other methods for reestablishing sequencing after connection loss between distributed subscriber database and a 5G Core are also disclosed. Some such methods include: providing a Unified Data Management system that includes a Distributed Subscriber Database and connects to a plurality of 5G Cores, wherein each 5G Core in turn connects to individual 5G end user mobile devices; recording authentication sequence numbers from the Distributed Subscriber Database to the distributed 5G Cores using a distributed ledger of a blockchain; in response to a lost connection between a 5G Core of the plurality of 5G Cores and the Distributed Subscriber Database, enabling the 5G Core to operate from a local copy of the Distributed Subscriber Database; reconnecting the lost connection between the 5G Core of the plurality of 5G Cores and the Distributed Subscriber Database; identifying a number sequencing issue between the Distributed Subscriber Database and the reconnected 5G Core of the plurality of 5G Cores; accessing the recorded authentication sequence numbers from the Distributed Subscriber Database using the distributed ledger of the blockchain; and obviating the number sequencing issue between the Distributed Subscriber Database and the reconnected 5G Core of the plurality of 5G Cores using the recorded authentication sequence numbers in the distributed ledger of the blockchain.

Moreover, in other embodiments, one or more systems for reestablishing sequencing after connection loss between distributed subscriber database and a 5G Core are also disclosed. The system includes: a memory that stores computer executable instructions; and a processor that executes the computer executable instructions to cause operations to be performed, the operations including: provide a Unified Data Management system that connects to a plurality of 5G Cores, wherein each 5G Core in turn connects to individual 5G end user mobile devices; record authentication sequence numbers from the Distributed Subscriber Database to the distributed 5G Cores using a distributed ledger of a blockchain; in response to a lost connection between a 5G Core of the plurality of 5G Cores and the Distributed Subscriber Database, enable the 5G Core to operate from a local copy of the Distributed Subscriber Database; reconnect the lost connection between the 5G Core of the plurality of 5G Cores and the Distributed Subscriber Database; identify a number sequencing issue between the Distributed Subscriber Database and the reconnected 5G Core of the plurality of 5G Cores; access the recorded authentication sequence numbers from the Distributed Subscriber Database using the distributed ledger of the blockchain; and obviate the number sequencing issue between the Distributed Subscriber Database and the reconnected 5G Core of the plurality of 5G Cores using the recorded authentication sequence numbers in the distributed ledger of the blockchain.

In still other embodiments, one or more non-transitory computer-readable storage mediums are also disclosed. The one or more non-transitory computer-readable storage mediums have computer-executable instructions stored thereon that, when executed by a processor, cause the processor to: provide a Unified Data Management system that connects to a plurality of 5G Cores, wherein each 5G Core in turn connects to individual 5G end user mobile devices; record authentication sequence numbers from the system to the distributed 5G Cores using a distributed ledger of a blockchain; in response to a lost connection between a 5G Core of the plurality of 5G Cores and the Distributed Subscriber Database, enable the 5G Core to operate from a local copy of the Distributed Subscriber Database; reconnect the lost connection between the 5G Core of the plurality of 5G Cores and the Distributed Subscriber Database; identify a number sequencing issue between the Distributed Subscriber Database and the reconnected 5G Core of the plurality of 5G Cores; access the recorded authentication sequence numbers from the Distributed Subscriber Database using the distributed ledger of the blockchain; and obviate the number sequencing issue between the Distributed Subscriber Database and the reconnected 5G Core of the plurality of 5G Cores using the recorded authentication sequence numbers in the distributed ledger of the blockchain.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
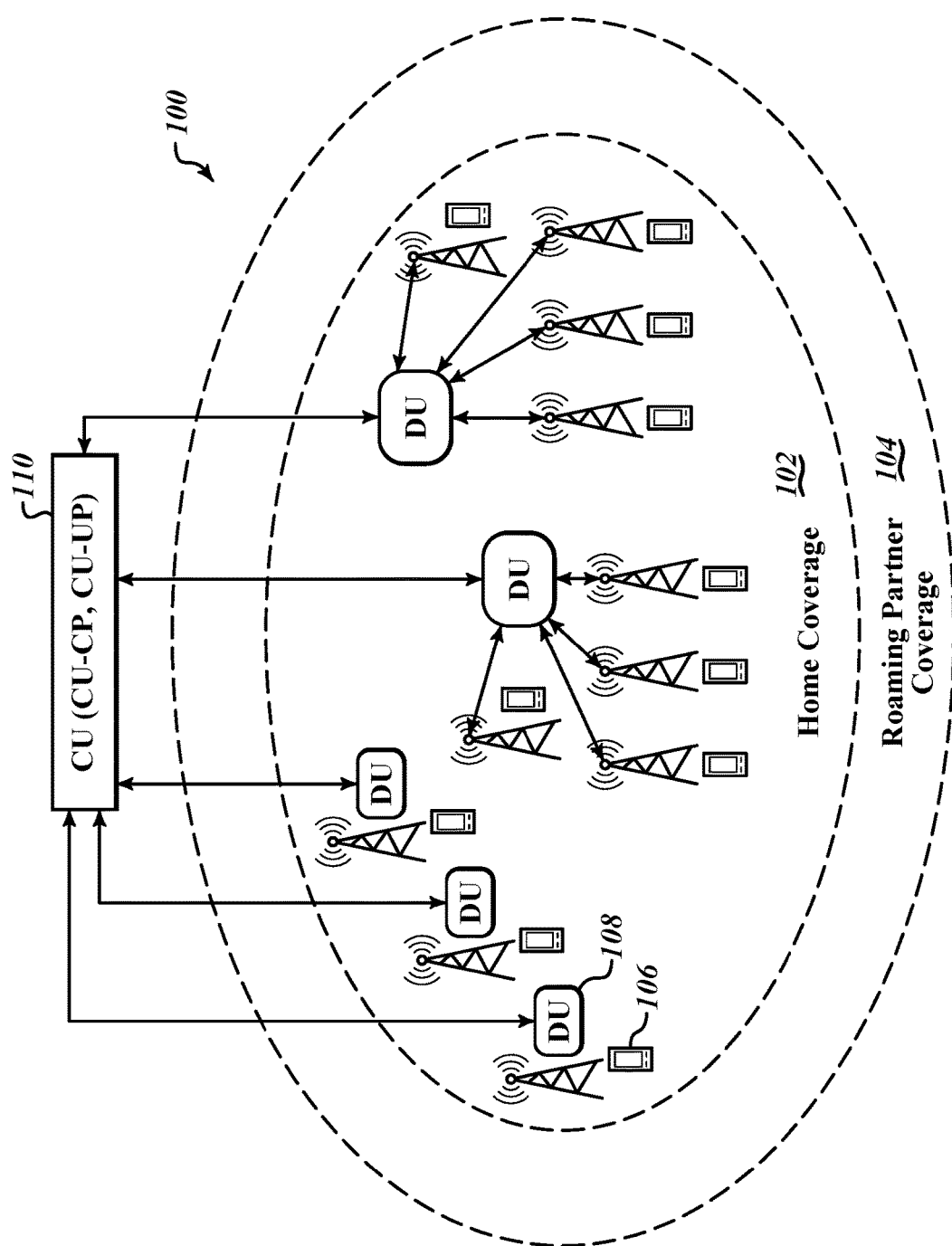
FIG. 1 illustrates a context diagram of an environment in which a system for reestablishing sequencing after connection loss between distributed subscriber database and a 5G Core may be implemented in accordance with embodiments described herein.

FIG. 1 illustrates a context diagram of an environment in which a system for reestablishing sequencing after connection loss between distributed subscriber database and a 5G Core may be implemented in accordance with embodiments described herein.

A given area 100 will mostly be covered by two or more mobile network operators' wireless networks. Generally, mobile network operators have some roaming agreements that allow users to roam from home network to partner network under certain conditions, shown in FIG. 1 as home coverage area 102 and roaming partner coverage area 104. Operators may configure the mobile user's device, referred to herein as user equipment (UE), such as UE 106, with priority and a timer to stay on the home network coverage area 102 versus the roaming partner network coverage area 104. If a UE (e.g., UE 106) cannot find the home network coverage area 102, the UE will scan for a roaming network after a timer expiration (6 minutes, for example). This could have significant impact on customer experience in case of a catastrophic failure in the network. As shown in FIG. 1, a 5G RAN is split into DUs (e.g., DU 108) that manage scheduling of all the users and a CU that manages the mobility and radio resource control (RRC) state for all the UEs. The RRC is a layer within the 5G NR protocol stack. It exists only in the control plane, in the UE and in the gNB. The behavior and functions of RRC are governed by the current state of RRC. In 5G NR, RRC has three distinct states: RRC_IDLE, RRC_CONNECTED and RRC_INACTIVE.

Figure 2:
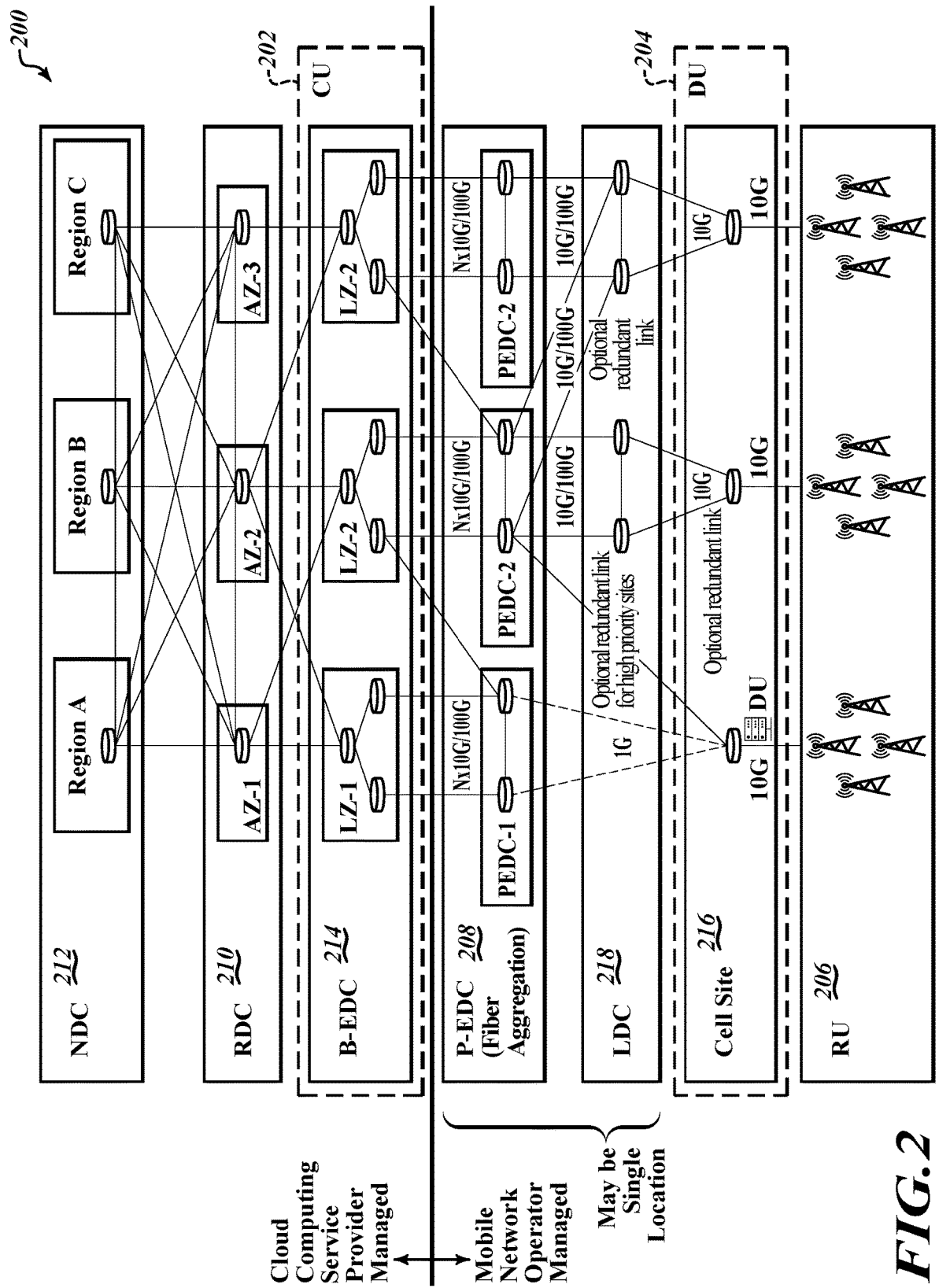
FIG. 2 illustrates a diagram of an example system architecture overview of a system in which the environment of FIG. 1 may be implemented in accordance with embodiments described herein.

FIG. 2 illustrates a diagram of an example system architecture overview of a system 200 in which the environment of FIG. 1 may be implemented in accordance with embodiments described herein.

As shown in FIG. 2, the radio unit (RU) 206 converts radio signals sent to and from the antenna into a digital signal for transmission over packet networks. It handles the digital front end (DFE) and the lower physical (PHY) layer, as well as the digital beamforming functionality.

The DU 204 may sit close to the RU 206 and runs the radio link control (RLC), the Medium Access Control (MAC) sublayer of the 5G NR protocol stack, and parts of the PHY layer. The MAC sublayer interfaces to the RLC sublayer from above and to the PHY layer from below. The MAC sublayer maps information between logical and transport channels. Logical channels are about the type of information carried whereas transport channels are about how such information is carried. This logical node includes a subset of the gNB functions, depending on the functional split option, and its operation is controlled by the CU 202.

The CU 202 is the centralized unit that runs the RRC and Packet Data Convergence Protocol (PDCP) layers. A gNB may comprise a CU and one DU connected to the CU via Fs-C and Fs-U interfaces for control plane (CP) and user plane (UP), respectively. A CU with multiple DUs will support multiple gNBs. The split architecture enables a 5G network to utilize different distribution of protocol stacks between CU 202 and DU 204 depending on mid-haul availability and network design. The CU 202 is a logical node that includes the gNB functions like transfer of user data, mobility control, RAN sharing, positioning, session management, etc., with the exception of functions that may be allocated exclusively to the DU 204. The CU 202 controls the operation of several DUs 204 over the mid-haul interface.

As mentioned above, 5G network functionality is split into two functional units: the DU 204, responsible for real time 5G layer 1 (L1) and 5G layer 2 (L2) scheduling functions, and the CU 202 responsible for non-real time, higher L2 and 5G layer 3 (L3). As shown in FIG. 2, the DU's server and relevant software may be hosted on a cell site 216 itself or can be hosted in an edge cloud (local data center (LDC) 218 or central office) depending on transport availability and fronthaul interface. The CU's server and relevant software may be hosted in a regional cloud data center or, as shown in FIG. 2, in a breakout edge data center (B-EDC) 214. As shown in FIG. 2, the DU 204 may be provisioned to communicate via a pass-through edge data center (P-EDC) 208. The P-EDC 208 may provide a direct circuit fiber connection from the DU directly to the primary cloud availability zone (e.g., B-EDC 214) hosting the CU 202. In some embodiments, the LDC 218 and P-EDC 208 may be co-located or in a single location. The CU 202 may be connected to a regional cloud data center (RDC) 210, which in turn may be connected to a national cloud data center (NDC) 212. In the example embodiment, the P-EDC 208, the LDC 218, the cell site 216 and the RU 206 may all be managed by the mobile network operator and the B-EDC 214, the RDC 210 and the NDC 212 may all be managed by a cloud computing service provider. According to various embodiments, the actual split between DU and RU may be different depending on the specific use-case and implementation.

Figure 3:
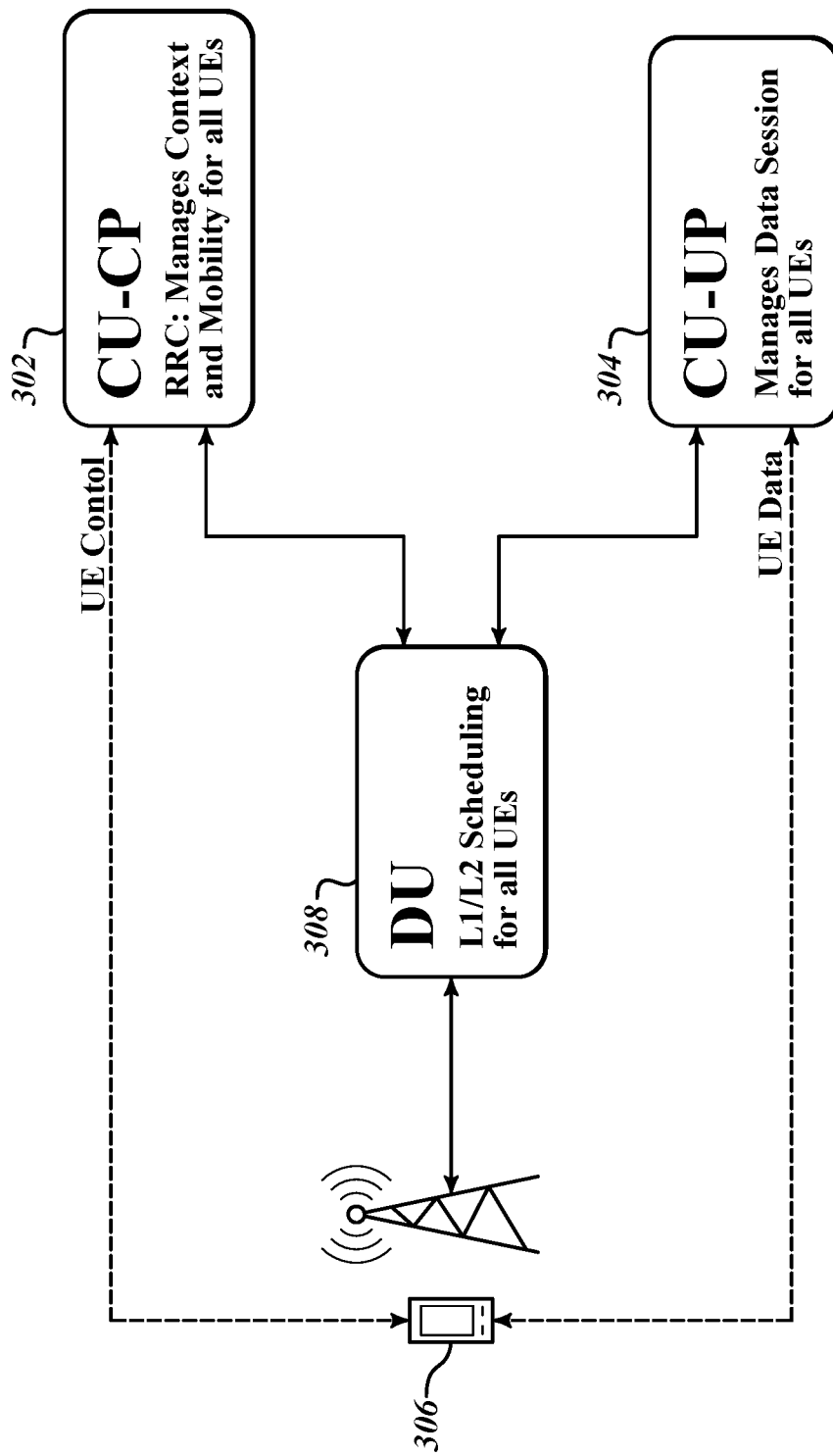
FIG. 3 illustrates a diagram showing connectivity between certain telecommunication network components during cellular telecommunication.

FIG. 3 is a diagram showing connectivity between certain telecommunication network components during cellular telecommunication in accordance with embodiments described herein.

The central unit control plane (CU-CP), for example of CU 110 of FIG. 1 or CU 202 of FIG. 2, primarily manages control processing of DUs, such as DU 308, and UEs, such as UE 302. The CU-CP 302 hosts RRC and the control-plane part of the PDCP protocol. CU-CP 302 manages the mobility and radio resource control (RRC) state for all the UEs. The RRC is a layer within the 5G NR protocol stack and manages context and mobility for all UEs. The behavior and functions of RRC are governed by the current state of RRC. In 5G NR, RRC has three distinct states: RRC_IDLE, RRC_CONNECTED and RRC_INACTIVE. The CU-CP 302 terminates the E1 interface connected with the central unit user plane (CU-UP) 304 and the F1-C interface connected with the DU 308. The DU 308 maintains a constant heartbeat with CU 302. The CU-UP 304 manages the data sessions for all UEs 306 and hosts the user plane part of the PDCP protocol. The CU-UP 304 terminates the E1 interface connected with the CU-CP and the F1-U interface connected with the DU 308.

A virtual private cloud is a configurable pool of shared resources allocated within a public cloud environment. The VPC provides isolation between one VPC user and all other users of the same cloud, for example, by allocation of a private IP subnet and a virtual communication construct (e.g., a VLAN or a set of encrypted communication channels) per user. In some embodiments, this 5G network leverages the distributed nature of 5G cloud-native network functions and cloud flexibility, which optimizes the placement of 5G network functions for optimal performance based on latency, throughput and processing requirements.

In some embodiments, the network architecture utilizes a logical hierarchical architecture consisting of National Data Centers (NDCs), Regional Data Centers (RDCs) and Breakout Edge Data Centers (BEDCs), to accommodate the distributed nature of 5G functions and the varying requirements for service layer integration. In one or more embodiments, BEDCs are deployed in Local Zones hosting 5G NFs that have strict latency budgets. They may also be connected with Passthrough Edge Data Centers (PEDC), which serve as an aggregation point for all Local Data Centers (LDCs) and cell sites in a particular market. BEDCs also provide internet peering for 5G data service.

In one or more embodiments, an O-RAN network may be implemented that includes an RU (Radio Unit), which is deployed on towers and a DU (Distributed Unit), which controls the RU. These units interface with the Centralized Unit (CU), which is hosted in the BEDC at the Local Zone. These combined pieces provide a full RAN solution that handles all radio level control and subscriber data traffic.

In some embodiments, the User Plane Function (Data Network Name (DNN)) is collocated in the BEDC, which anchors user data sessions and routes to the internet. In another aspect, the BEDCs leverage local internet access available in Local Zones, which allows for a better user experience while optimizing network traffic utilization.

In one of more embodiments, the Regional Data Centers (RDCs) are hosted in the Region across multiple availability zones. The RDCs host 5G subscribers' signaling processes such as authentication and session management as well as voice for 5G subscribers. These workloads can operate with relatively high latencies, which allows for a centralized deployment throughout a region, resulting in cost efficiency and resiliency. For high availability, multiple RDCs are deployed in a region, each in a separate Availability Zone (AZ) to ensure application resiliency and high availability.

In another aspect of some embodiments, an AZ is one or more discrete data centers with redundant power, networking, and connectivity in a Region. In some embodiments, AZs in a Region are interconnected with high-bandwidth and low-latency networking over a fully redundant, dedicated metro fiber, which provides high-throughput, low-latency networking between AZs.

Cloud Native Functions (CNFs) deployed in the RDC utilize a high speed backbone to failover between AZs for application resiliency. CNFs like AMF and SMF, which are deployed in RDC, continue to be accessible from the BEDC in the Local Zone in case of an AZ failure. They serve as the backup CNF in the neighboring AZ and would take over and service the requests from the BEDC.

In this embodiment of the system for reestablishing sequencing after connection loss between distributed subscriber database and a 5G Core, dedicated VPCs are implemented for each Data Center type (e.g., local data center, breakout edge data center, regional data center, national data center, and the like). In some such embodiments, the national data center VPC stretches across multiple Availability Zones (AZs). In another aspect of some embodiments, two or more AZs are implemented per region of the cloud computing service provider.

Some embodiments of the 5G Core network functions require support for advanced routing capabilities inside VPC and across VPCs (e.g., UPF, SMF and ePDG). These functions rely on routing protocols such as BGP for route exchange and fast failover (both stateful and stateless). To support these requirements, virtual routers are deployed on EC2 to provide connectivity within and across VPCs, as well as back to the on-prem network.

Figure 4A:
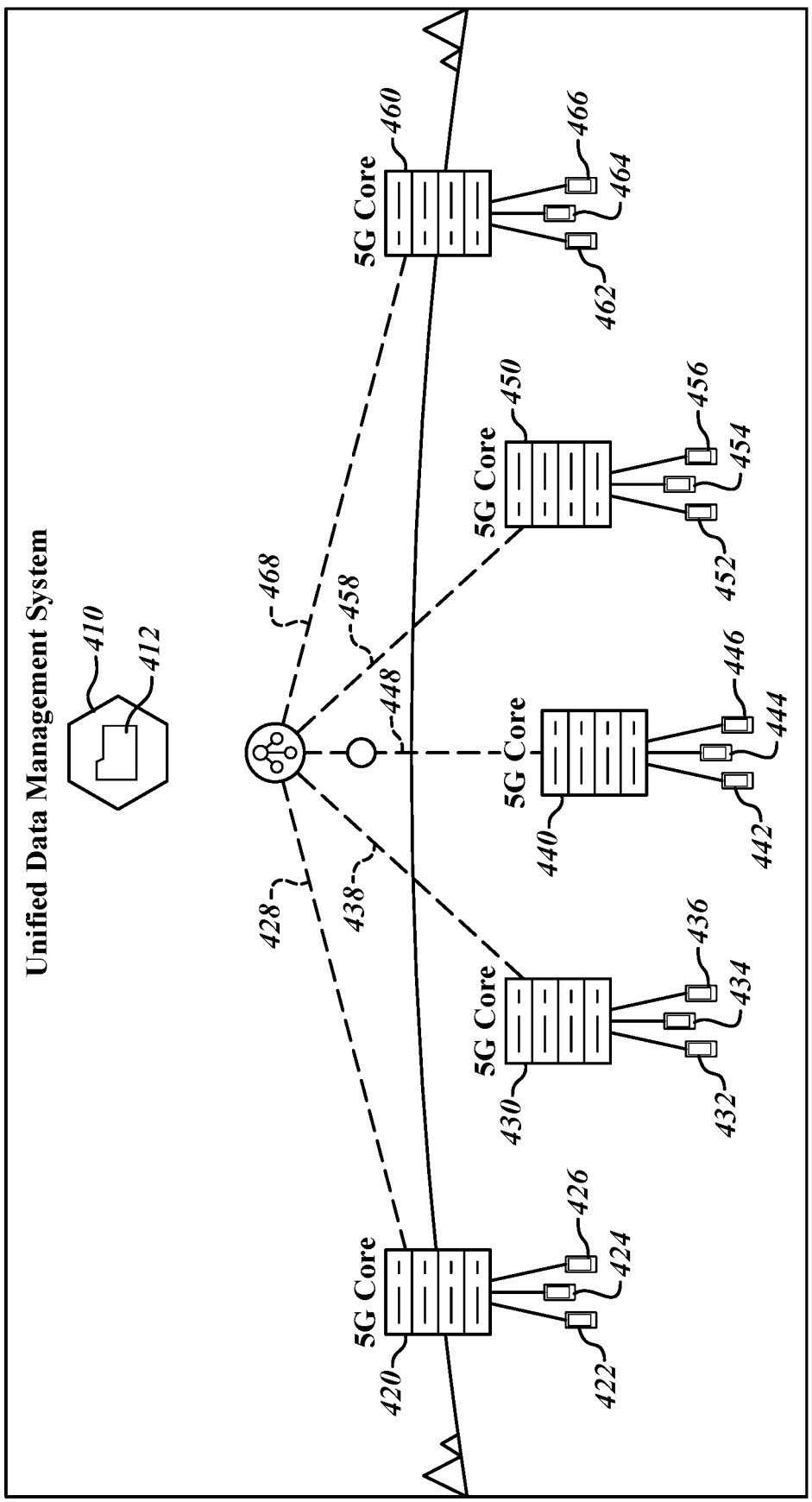
FIG. 4A illustrates a system that includes a central distributed subscriber database, a plurality of connected 5G Cores, and a plurality of mobile end user devices connected to each 5G Core.

FIG. 4A illustrates a system for reestablishing sequencing after connection loss between distributed subscriber database and a 5G Core that includes a Unified Data Management System 410, central distributed subscriber database 412, a plurality of connected 5G Cores 420, 430, 440, 450, and 460, and a plurality of mobile end user devices 422, 424, 426, 432, 434, 436, 442, 444, 446, 452, 454, 456, 462, 464, and 466. The central distributed subscriber database 412 is contained in the Unified Data Management System 410. The plurality of connected 5G Cores 420, 430, 440, 450, and 460 are each connected to the central distributed subscriber database 412 by connection lines 428, 438, 448, 458, and 468. The connection lines 428, 438, 448, 458, and 468 transmit voice and data information as well as control information, between the central distributed subscriber database 412 and the plurality of connected 5G Cores 420, 430, 440, 450, and 460. This information also includes number sequencing information that is transmitted between the central distributed subscriber database 412 and the plurality of connected 5G Cores 420, 430, 440, 450, and 460. Additionally, the plurality of mobile end user devices 422, 424, 426, 432, 434, 436, 442, 444, 446, 452, 454, 456, 462, 464, and 466 are each connected to their respective 5G Cores 420, 430, 440, 450, and 460. In some embodiments this is a direct connection, while in other embodiments, there are additional telephony components (e.g., antennas, receivers, and the like) that bridge the connection between the plurality of mobile end user devices 422, 424, 426, 432, 434, 436, 442, 444, 446, 452, 454, 456, 462, 464, and 466 that are each connected to their respective 5G Cores 420, 430, 440, 450, and 460.

Figure 4B:
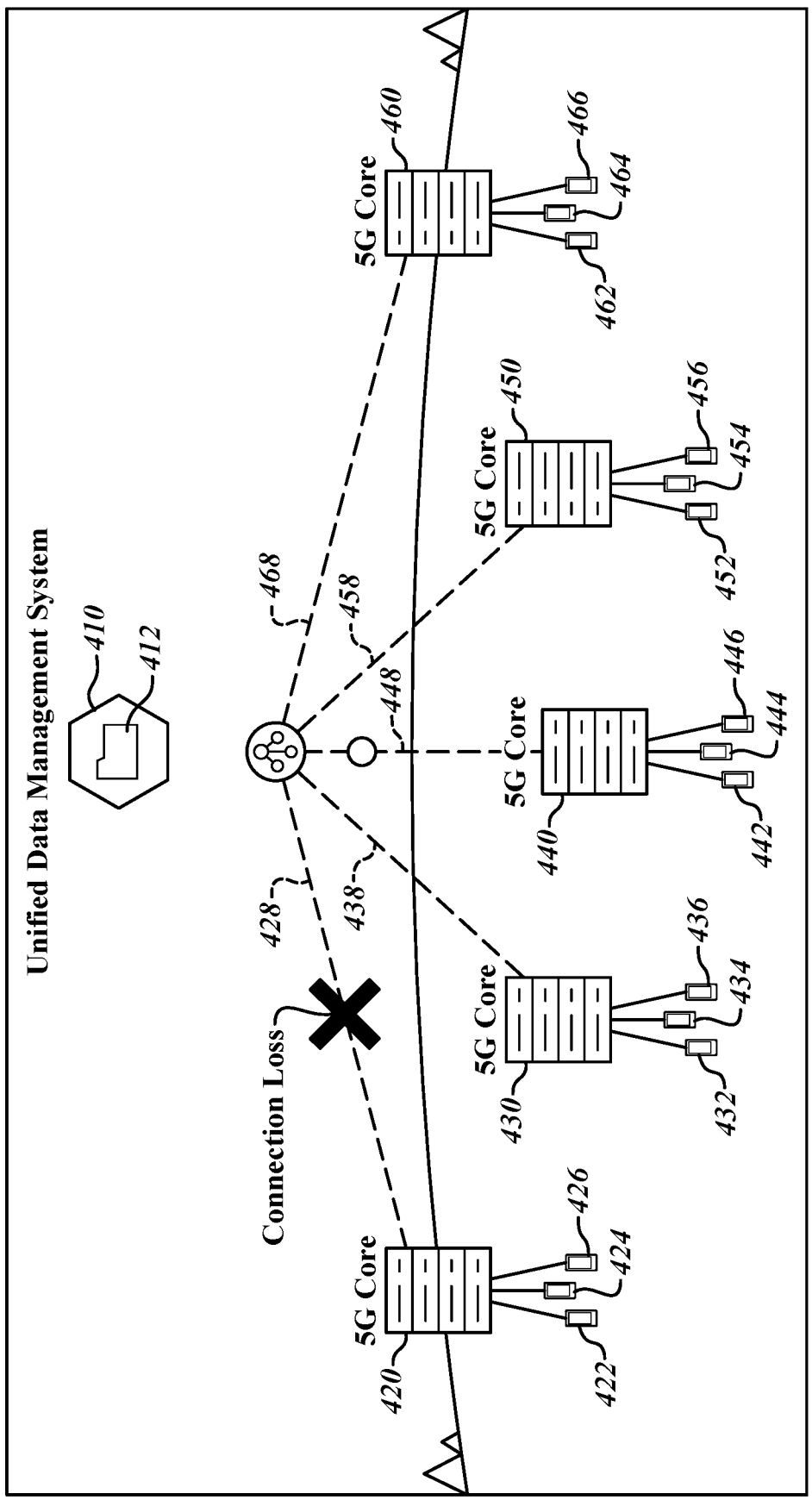
FIG. 4B illustrates the system shown in FIG. 4A where the distributed subscriber database has lost connection with one of the 5G Cores.

Referring now to FIG. 4B, the system of FIG. 4A is again shown for reestablishing sequencing after connection loss between distributed subscriber database and a 5G Core. However, in this embodiment, the distributed subscriber database 412 has lost connection with one of the 5G Cores 422, due to a disruption in connection line 428. There may be various reasons for such a lost connection that include by way of example only, and not be way of limitation, large scale power failure, local outages, physical damage to a component, planned maintenance, unplanned component failure, and the like. In some such systems, the plurality of 5G Cores 420, 430, 440, 450, and 460 are each configured so that they are able to independently maintain operations for their respective mobile end user devices 422, 424, 426, 432, 434, 436, 442, 444, 446, 452, 454, 456, 462, 464, and 466 after a connection loss by using a local copy of the information necessary for operation.

Figure 4C:
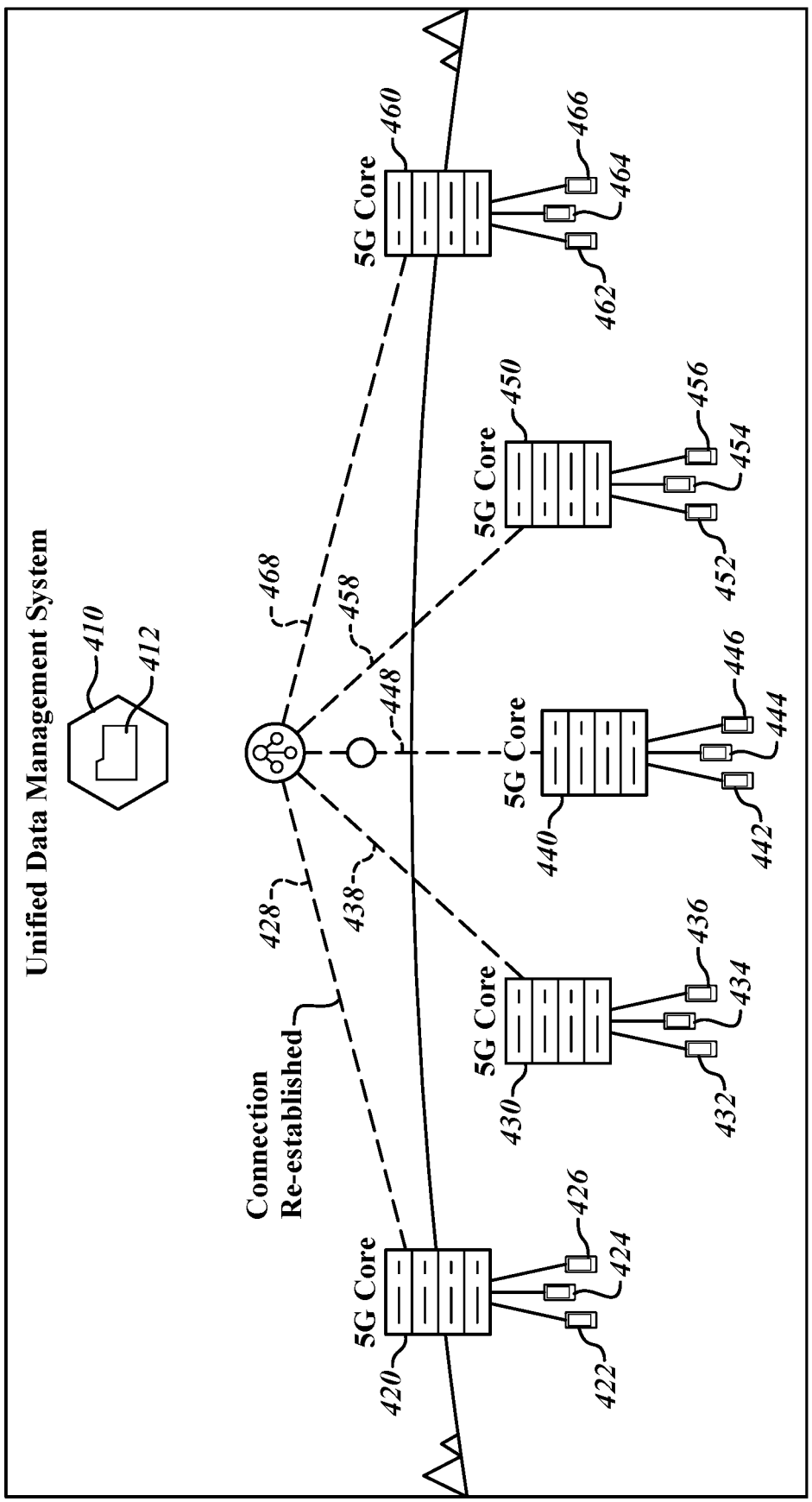
FIG. 4C illustrates the system shown in FIG. 4A where the distributed subscriber database has re-established connection with the 5G Core that had previously lost its connection with the distributed subscriber database.

Referring now to FIG. 4C, the system of FIG. 4A is again shown for reestablishing sequencing after connection loss between distributed subscriber database and a 5G Core. However, in this embodiment, the distributed subscriber database 412 has been able to re-reestablish connection with the 5G Core 420 that had previously lost its connection line 428 with the distributed subscriber database. Thus, the plurality of 5G Cores 420, 430, 440, 450, and 460 are each configured so that they are able to switch back to using the information transmitted from the distributed subscriber database 412 instead of independently maintaining operations for their respective mobile end user devices 422, 424, 426, 432, 434, 436, 442, 444, 446, 452, 454, 456, 462, 464, and 466. Nevertheless, while the connection line 428 may now be successfully transmitting voice and data information, as well as control information, between the central distributed subscriber database 412 and the 5G Core 420, there may now be a number sequencing discrepancy with this information due to the time that the 5G Core 420 was disconnected from the central distributed subscriber database 412 and operating on a local copy of information.

While it may be possible for the system to allow the 5G Core to function in the network with a number sequencing discrepancy, this opens the network up to various security issues and fraud. For example, if a malicious actor were to clone a 5G mobile device such as a 5G phone, the malicious actor may be able to circumvent many of the security features that are used to protect against such an attack on the network. However, one security feature that the malicious actor will not be able to circumvent is the number sequencing discrepancy that the cloned 5G phone will have with the central distributed subscriber database 412. By requiring the system to enforce proper number sequencing correspondence, a security feature is enabled that assists in thwarting fraud attempts by malicious actors. Thus, in one or more embodiments of the system for reestablishing sequencing after connection loss between distributed subscriber database and a 5G Core, the system is able to identify a fraudulent individual 5G end user mobile device using number sequencing anomalies by checking the authentication sequence numbers in a suspicious mobile end user device against the recorded authentication sequence numbers in the distributed ledger of the blockchain.

Accordingly, in some embodiments of the system for reestablishing sequencing after connection loss between distributed subscriber database and a 5G Core, the distributed subscriber database 412 uploads the number sequencing information to the distributed ledger of the blockchain that is then available to the plurality of 5G Cores 420, 430, 440, 450, and 460. Then, when the distributed subscriber database 412 has been able to reestablish connection with a 5G Core that had previously lost its connection, the system is able to identify a number sequencing issue between the distributed subscriber database 412 and the reconnected 5G Core that is due to the connection lost.

In response to identifying the number sequencing issue, the reconnected 5G Core is able to access the recorded authentication sequence numbers from the distributed subscriber database 412 that were recorded in the distributed ledger of the blockchain. In this manner, the number sequencing issue is obviated between the distributed subscriber database 412 and the reconnected 5G Core 422 using the recorded authentication sequence numbers in the distributed ledger of the blockchain. In some embodiments, the number sequencing issue is corrected between the distributed subscriber database 412 and the reconnected 5G Core 422 by securely replicating the recorded authentication sequence numbers in the distributed ledger of the blockchain and redistributing the recorded authentication sequence numbers to the reconnected 5G Core.

In some embodiments of the system for reestablishing sequencing after connection loss between distributed subscriber database and a 5G Core, each individual mobile end user device 422, 424, 426, 432, 434, 436, 442, 444, 446, 452, 454, 456, 462, 464, and 466 is connected to its associated 5G Core 420, 430, 440, 450, and 460 using an IMSI (International Mobile Subscriber Identifier) number. An IMSI is a unique number associated with Global System for Mobile Communications (GSM) and Universal Mobile Telecommunications System (UMTS) network mobile phone users. As such, the IMSI is a unique number that identifies a mobile end user that is a subscriber to the carrier network.

In another aspect of some embodiments of the system, a mobile subscriber of each individual mobile end user devices is identified by its SIM (Subscriber Identity Module) card. A SIM card is a smart card inside a mobile phone that includes an identification number that is unique to the owner of the mobile end user device. The SIM card may store personal data and prevent operation if it is removed. The SIM card may also include an authentication key that is used to authenticate the owner of the mobile end user device. Additionally, the SIM card includes a processor, memory, and security circuits.

In another aspect of the system for reestablishing sequencing after connection loss between distributed subscriber database and a 5G Core, distributed key authentication may be used to authenticate the 5G Cores 420, 430, 440, 450, and 460, the 5G mobile end user devices 422, 424, 426, 432, 434, 436, 442, 444, 446, 452, 454, 456, 462, 464, and 466, or both. In some embodiments, the distributed keys are placed in the distributed ledger blockchain with the authentication sequence numbers from the distributed subscriber database 412, instead of in the SIM cards of the 5G mobile end user devices. Thus, in such embodiments, the 5G mobile end user devices 422, 424, 426, 432, 434, 436, 442, 444, 446, 452, 454, 456, 462, 464, and 466 employ blockchain-based authentication, instead of SIM card-based authentication. In still other embodiments, the distributed keys are placed in the distributed ledger blockchain, instead of in the SIM cards of the 5G mobile end user devices, and the system does not record the authentication sequence numbers from the distributed subscriber database 412 in the distributed ledger blockchain. In such embodiments, the 5G mobile end user devices 422, 424, 426, 432, 434, 436, 442, 444, 446, 452, 454, 456, 462, 464, and 466 still employ blockchain-based authentication, instead of SIM card-based authentication, but the blockchain based numerical sequence reestablishment is not employed.

Figure 5:
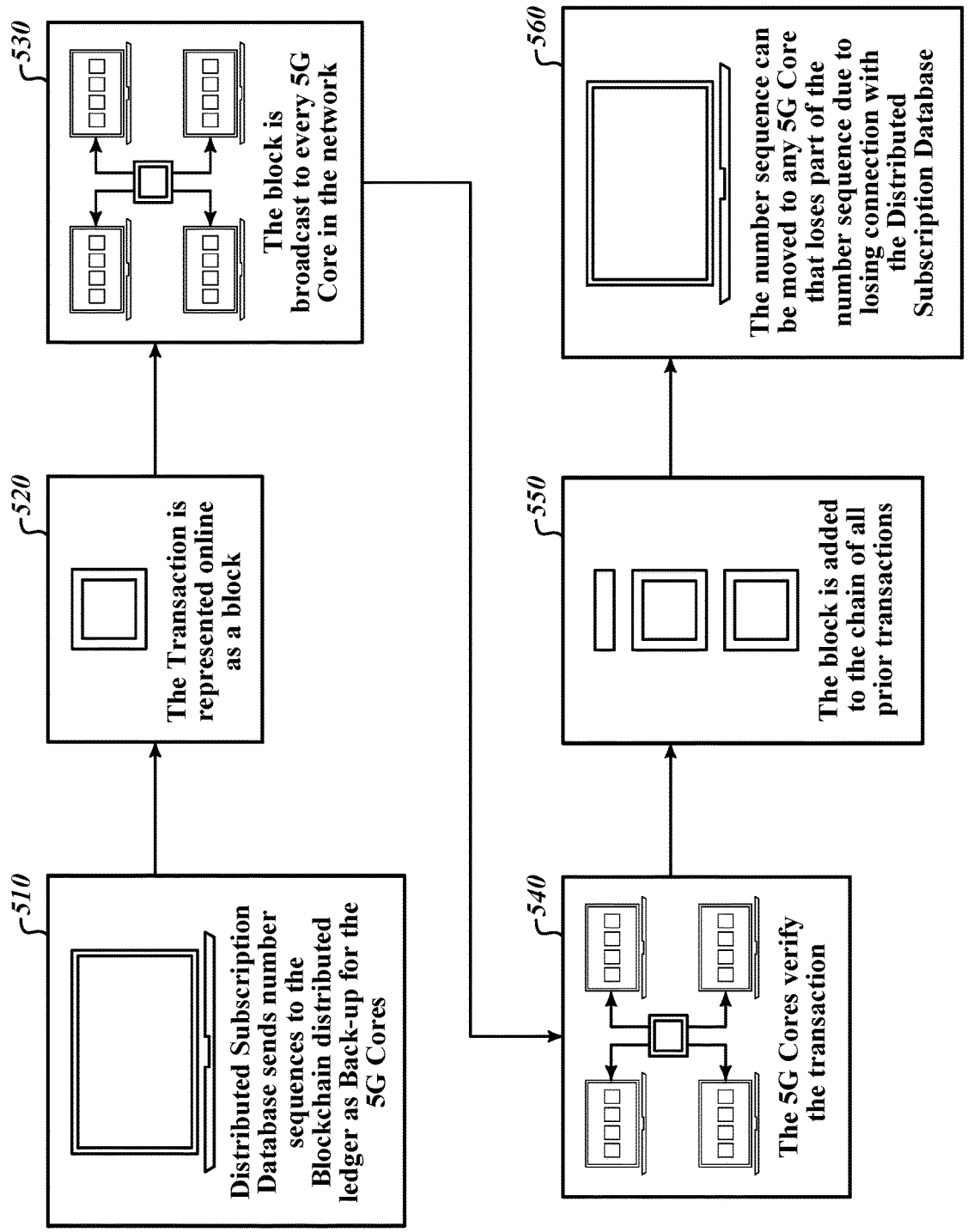
FIG. 5 illustrates a logic diagram that shows the process of the distributed subscriber database uploading number sequencing information to the distributed ledger of the blockchain that is then available to the plurality of 5G Cores.

Referring now to FIG. 5, a logic diagram is shown that displays the process of the distributed subscriber database 412 uploading number sequencing information to the distributed ledger of the blockchain that is then available to the plurality of 5G Cores. In some embodiments of this 5G system architecture, at operation 510, Distributed Subscription Database sends authentication sequence numbers to the Blockchain distributed ledger as Back-up for the 5G Cores. At operation 520, the transaction is represented online as a block. At operation 530, the block is broadcast to every 5G Core in the network. At operation 540, the 5G Cores verify the transaction. At operation 550, the block is added to the chain of all prior transactions. At operation 560, the number sequence can be moved to any 5G Core that loses part of the number sequence due to losing connection with the Distributed Subscription Database.

Figure 6:
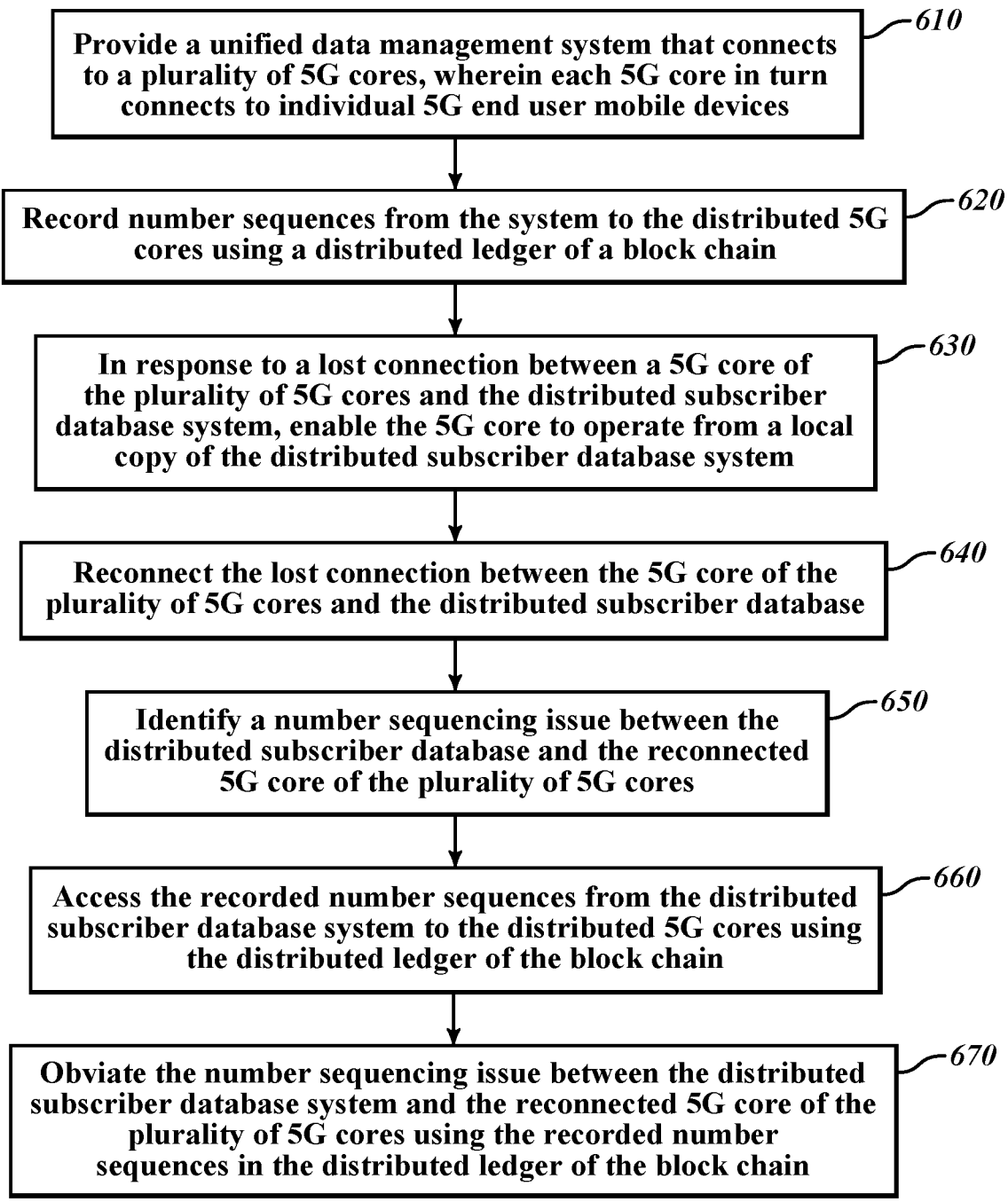
FIG. 6 is a logic diagram showing number sequencing data flow between certain telecommunication network components during upload to the blockchain and distribution to the 5G Cores.

FIG. 6 is a logic diagram showing the system for reestablishing sequencing after connection loss between distributed subscriber database and a 5G Core. As shown in FIG. 6, at operation 610, a Unified Data Management system is provided that includes a Distributed Subscriber Database and connects to a plurality of 5G Cores. Each 5G Core in turn connects to individual 5G end user mobile devices. At operation 620, authentication sequence numbers are recorded from the Distributed Subscriber Database to the distributed 5G Cores using a distributed ledger of a blockchain. At operation 630, the 5G Core operates from a local copy of the Distributed Subscriber Database in response to a lost connection between a 5G Core of the plurality of 5G Cores and the Distributed Subscriber Database. At operation 640, the lost connection is reconnected between the 5G Core of the plurality of 5G Cores and the Distributed Subscriber Database. Optionally, at operation 650, a number sequencing issue is identified between the Distributed Subscriber Database and the reconnected 5G Core of the plurality of 5G Cores. At operation 660, the recorded authentication sequence numbers usually sent from the Distributed Subscriber Database to the distributed 5G Cores are accessed using the distributed ledger of the blockchain. At operation 670, the number sequencing issue between the Distributed Subscriber Database and the reconnected 5G Core of the plurality of 5G Cores is obviated using the recorded authentication sequence numbers in the distributed ledger of the blockchain.

Figure 7:
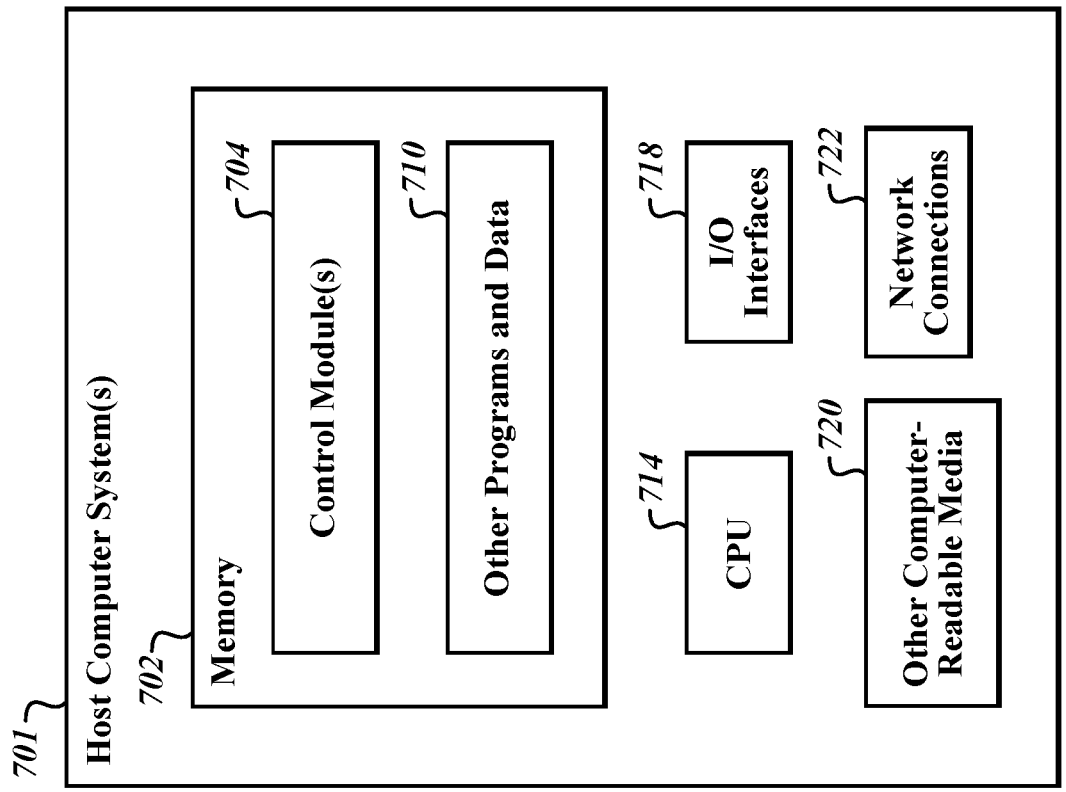
FIG. 7 shows a system diagram that describes an example implementation of a computing system(s) for implementing embodiments described herein.

FIG. 7 shows a system diagram that describes an example implementation of a computing system(s) for implementing embodiments described herein. The functionality described herein for reestablishing sequencing after connection loss between distributed subscriber database and a 5G Core, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility.

In particular, shown is example host computer system(s) 701. For example, such computer system(s) 701 may represent those in various data centers and cell sites shown and/or described herein that host the functions, components, microservices and other aspects described herein to implement the reestablishing sequencing after connection loss between distributed subscriber database and a 5G Core. In some embodiments, one or more special-purpose computing systems may be used to implement the functionality described herein. Accordingly, various embodiments described herein may be implemented in software, hardware, firmware, or in some combination thereof. Host computer system(s) 701 may include memory 702, one or more central processing units (CPUs) 714, I/O interfaces 718, other computer-readable media 720, and network connections 722.

Memory 702 may include one or more various types of non-volatile and/or volatile storage technologies. Examples of memory 702 may include, but are not limited to, flash memory, hard disk drives, optical drives, solid-state drives, various types of random-access memory (RAM), various types of read-only memory (ROM), other computer-readable storage media (also referred to as processor-readable storage media), or the like, or any combination thereof. Memory 702 may be utilized to store information, including computer-readable instructions that are utilized by CPU 714 to perform actions, including those of embodiments described herein.

Memory 702 may have stored thereon control module(s) 704. The control module(s) 704 may be configured to implement and/or perform some or all of the functions of the systems, components and modules described herein for reestablishing sequencing after connection loss between distributed subscriber database and a 5G Core. Memory 702 may also store other programs and data 710, which may include rules, databases, application programming interfaces (APIs), software platforms, cloud computing service software, network management software, network orchestrator software, network functions (NF), AI or ML programs or models to perform the functionality described herein, user interfaces, operating systems, other network management functions, other NFs, etc.

Network connections 722 are configured to communicate with other computing devices to facilitate the functionality described herein. In various embodiments, the network connections 722 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 718 may include a video interface, other data input or output interfaces, or the like. Other computer-readable media 720 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for reestablishing sequencing after connection loss between distributed subscriber database and a 5G Core, the method comprising:
    providing, by a mobile network operator, a distributed unit (DU) of a fifth-generation New Radio (5G NR) cellular telecommunication network radio access network (RAN) that is served by a particular 5G NR cellular site base station, wherein the DU:
        is associated with a primary 5G NR Next Generation Node B (gNB) identified by a primary identifier (ID); and
        is in operable communication with a corresponding primary central unit control plane (CU-CP) of a 5G NR primary centralized unit (CU) that is hosted on a cloud-native virtualized compute instance in a primary cloud availability zone and is also associated with the primary gNB identified by the primary ID;
    providing a Unified Data Management system that includes a Distributed Subscriber Database and connects to a plurality of 5G Cores, wherein each 5G Core in turn connects to individual 5G end user mobile devices;
    recording authentication sequence numbers from the Distributed Subscriber Database to the distributed 5G Cores using a distributed ledger of a blockchain;
    in response to a lost connection between a 5G Core of the plurality of 5G Cores and the Distributed Subscriber Database, enabling the 5G Core to operate from a local copy of the Distributed Subscriber Database;
    reconnecting the lost connection between the 5G Core of the plurality of 5G Cores and the Distributed Subscriber Database;
    identifying a number sequencing issue between the Distributed Subscriber Database and the reconnected 5G Core of the plurality of 5G Cores;
    accessing the recorded authentication sequence numbers from the Distributed Subscriber Database using the distributed ledger of the blockchain; and
    obviating the number sequencing issue between the Distributed Subscriber Database and the reconnected 5G Core of the plurality of 5G Cores using the recorded authentication sequence numbers in the distributed ledger of the blockchain.

2. The method of claim 1 further comprising: connecting each individual 5G end user mobile device to an associated 5G Core using an IMSI (International Mobile Subscriber Identifier) number.

3. The method of claim 1, further comprising: identifying a mobile subscriber of each individual 5G end user mobile device by its SIM (Subscriber Identity Module) card.

4. The method of claim 1, wherein the obviating a number sequencing issue between the Distributed Subscriber Database and the disconnected 5G Core of the plurality of 5G Cores further comprises employing a secure replication and redistribute technique.

5. The method of claim 1, wherein fraudulent individual 5G end user mobile devices are identified by number sequencing anomalies from checking against the recorded authentication sequence numbers in the distributed ledger of the blockchain.

6. The method of claim 1, wherein distributed key authentication is used to authenticate the 5G Cores.

7. The method of claim 1, wherein distributed keys are placed in the blockchain with the authentication sequence numbers from the Distributed Subscriber Database, instead of the 5G Cores.

8. A system for reestablishing sequencing after connection loss between distributed subscriber database and a 5G Core, the system comprising:
    a memory that stores computer executable instructions; and
    a processor that executes the computer-executable instructions and cause the processor to:
        provide a Unified Data Management system that connects to a plurality of 5G Cores, wherein each 5G Core in turn connects to individual 5G end user mobile devices;
        record authentication sequence numbers from the Distributed Subscriber Database to the distributed 5G Cores using a distributed ledger of a blockchain;
        in response to a lost connection between a 5G Core of the plurality of 5G Cores and the Distributed Subscriber Database, enable the 5G Core to operate from a local copy of the Distributed Subscriber Database;
        reconnect the lost connection between the 5G Core of the plurality of 5G Cores and the Distributed Subscriber Database;
        identify a number sequencing issue between the Distributed Subscriber Database and the reconnected 5G Core of the plurality of 5G Cores;
        access the recorded authentication sequence numbers from the Distributed Subscriber Database using the distributed ledger of the blockchain; and
        obviate the number sequencing issue between the Distributed Subscriber Database and the reconnected 5G Core of the plurality of 5G Cores using the recorded authentication sequence numbers in the distributed ledger of the blockchain.

9. The system of claim 8, further comprising: connecting each individual 5G end user mobile device to an associated 5G Core using an IMSI (International Mobile Subscriber Identifier) number.

10. The system of claim 8, further comprising: identifying a mobile subscriber of each individual 5G end user mobile device by its SIM (Subscriber Identity Module) card.

11. The system of claim 8, wherein the obviating a number sequencing issue between the Distributed Subscriber Database and the disconnected 5G Core of the plurality of 5G Cores further comprises employing a secure replication and redistribute technique.

12. The system of claim 8, wherein fraudulent individual 5G end user mobile devices are identified by number sequencing anomalies from checking against the recorded authentication sequence numbers in the distributed ledger of the blockchain.

13. The system of claim 8, wherein distributed key authentication is used to authenticate the 5G Cores.

14. The system of claim 8, wherein distributed keys are placed in the blockchain with the authentication sequence numbers from the Distributed Subscriber Database, instead of the 5G Cores.

15. A non-transitory computer-readable storage medium having computer-executable instructions stored thereon that, when executed by a processor, cause the processor to:
    provide a Unified Data Management system that connects to a plurality of 5G Cores, wherein each 5G Core in turn connects to individual 5G end user mobile devices;

record authentication sequence numbers from the system to the distributed 5G Cores using a distributed ledger of a blockchain;

in response to a lost connection between a 5G Core of the plurality of 5G Cores and a Distributed Subscriber Database, enable the 5G Core to operate from a local copy of the Distributed Subscriber Database;

reconnect the lost connection between the 5G Core of the plurality of 5G Cores and the Distributed Subscriber Database;

identify a number sequencing issue between the Distributed Subscriber Database and the reconnected 5G Core of the plurality of 5G Cores;

access the recorded authentication sequence numbers from the Distributed Subscriber Database using the distributed ledger of the blockchain; and obviate the number sequencing issue between the Distributed Subscriber Database and the reconnected 5G Core of the plurality of 5G Cores using the recorded authentication sequence numbers in the distributed ledger of the blockchain.

16. The non-transitory computer-readable storage medium of claim 15, further comprising: connecting each individual 5G end user mobile device to an associated 5G Core using an IMSI (International Mobile Subscriber Identifier) number.

17. The non-transitory computer-readable storage medium of claim 15, further comprising: identifying a mobile subscriber of each individual 5G end user mobile device by its SIM (Subscriber Identity Module) card.

18. The non-transitory computer-readable storage medium of claim 15, wherein fraudulent individual 5G end user mobile devices are identified by number sequencing anomalies from checking against the recorded authentication sequence numbers in the distributed ledger of the blockchain.

19. The non-transitory computer-readable storage medium of claim 15, wherein distributed key authentication is used to authenticate the 5G Cores.

20. The non-transitory computer-readable storage medium of claim 15, wherein distributed keys are placed in the blockchain with the authentication sequence numbers from the Distributed Subscriber Database, instead of the 5G Cores.

* * * * *